United States Patent
Karlsson et al.

(10) Patent No.: US 6,246,670 B1
(45) Date of Patent: Jun. 12, 2001

(54) METHOD AND APPARATUS FOR PREVENTING MISROUTING OF DATA IN A RADIO COMMUNICATION SYSTEM

(75) Inventors: Torgny Karlsson, Bromma; Dick Andersson, Kista, both of (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 08/951,966

(22) Filed: Oct. 16, 1997

(51) Int. Cl.[7] ............................................ H04L 12/26
(52) U.S. Cl. ........................ 370/244; 370/338; 370/401
(58) Field of Search ............................... 370/216, 241, 370/242, 244, 245, 246, 248, 250, 252, 312, 313, 328, 338, 349, 389, 392, 401, 351, 352, 353, 355, 356; 455/432, 435, 445; 709/227, 228, 245

(56) References Cited

U.S. PATENT DOCUMENTS

| | | | |
|---|---|---|---|
| 5,353,340 | * 10/1994 | Kunz | 455/432 |
| 5,410,543 | * 4/1995 | Seitz et al. | 370/463 |
| 5,430,709 | 7/1995 | Galloway | 370/13 |
| 5,467,341 | * 11/1995 | Matsukane et al. | 370/253 |
| 5,533,026 | * 7/1996 | Ahmadi et al. | 370/349 |
| 5,572,528 | 11/1996 | Shuen | 370/402 |
| 5,708,655 | * 1/1998 | Toth et al. | 370/313 |
| 5,835,725 | * 11/1998 | Chiang et al. | 709/228 |
| 5,920,816 | * 7/1999 | Khan et al. | 455/435 |

OTHER PUBLICATIONS

Wireless Networks, vol. 1, No. 3, Oct. 1995, "Using DHCP with Computers that Move", C. E. Perkins et al., pp. 341–353, XP000538245.

Data Communications, vol. 25, No. 12, Sep. 1996, "Containing the Chaos", L. Bruno, pp. 71–74, XP000626550.

Computer Networks and ISDN Systems, vol. 3, No. 27, Dec. 1994, "IMHP: A Mobile Host Protocol for the Internet", pp. 479–491, XP004037981.

Computer Communications, vol. 4, No. 19, Apr. 1996, "Quality of Service Guarantees in Mobile Computing", S. Singh, pp. 359–371, XP004032416.

* cited by examiner

*Primary Examiner*—Chi H. Pham
*Assistant Examiner*—Kwang B. Yao
(74) *Attorney, Agent, or Firm*—Jenkens & Gilchrist

(57) ABSTRACT

A method, and associated apparatus, prevents misrouting of packet-data in a radio communication system subsequent to an abnormal communication session termination by a wireless host. When a determination is made that a communication session between a wireless host and another host has terminated abnormally, a temporary address used to identify the wireless host is not permitted to be immediately reassigned to identify another wireless host. Misrouting of data to another wireless host subsequent to the abnormal communication session, termination is thereby avoided.

17 Claims, 2 Drawing Sheets

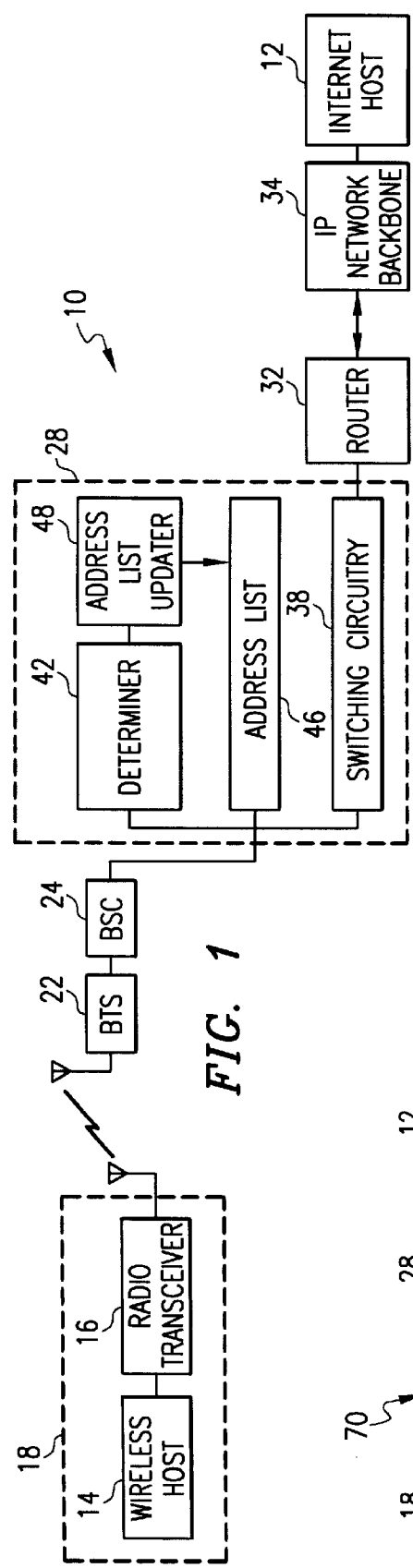
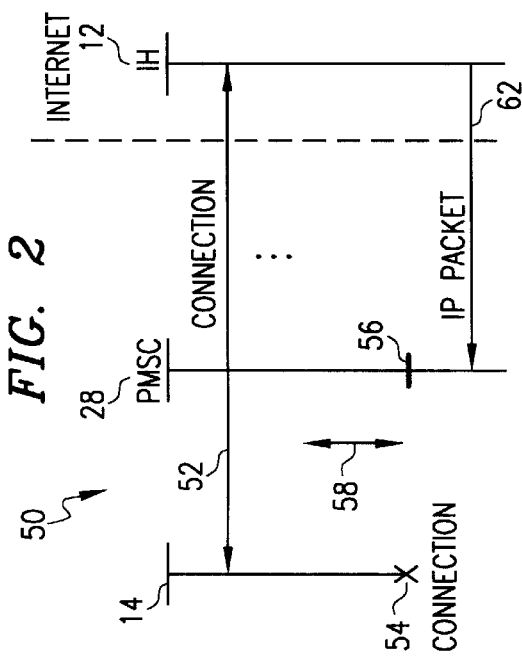
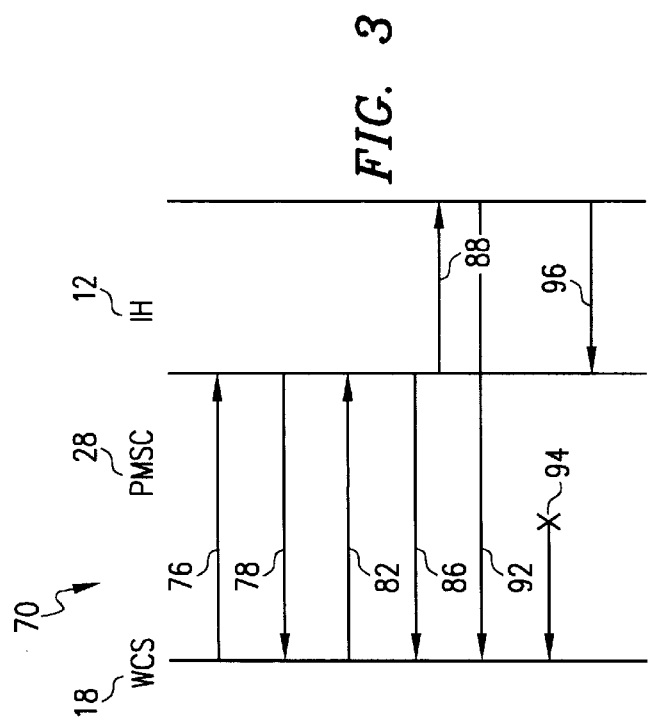

METHOD AND APPARATUS FOR PREVENTING MISROUTING OF DATA IN A RADIO COMMUNICATION SYSTEM

The present invention relates generally to the communication of packet data with a wireless host identified with a temporary address during a communication session between the wireless host and another host device. More particularly, the present invention relates to a method and apparatus for preventing misrouting of data subsequent to an abnormal termination of the communication session by the wireless host.

When the communication session is terminated by the wireless host abnormally, the other host device is unaware of the termination and continues sending packet data. Operation of an embodiment of the present invention selectively withholds reassignment of the temporary address, used to identify the terminating wireless host, thereby to prevent reassignment of the temporary address to identify another wireless host. Misrouting of data from the other host device to an other-than-intended wireless host is thereby avoided.

An embodiment of the present invention is operable, for instance, in an Internet application. A wireless host is coupled, in such an application, by way of a mobile communication system and an Internet backbone to an Internet host. In the event of abnormal communication session termination by the mobile host, the temporary address used to identify the wireless host is not immediately reassigned to identify another wireless host, thereby avoiding the misrouting of data to an other-than-intended wireless host.

BACKGROUND OF THE INVENTION

Many new types of communication systems have become feasible and commercially viable in recent years due to advancements in the fields of electronics and communications. The introduction and commercialization of such new types of communication systems have, in many instances, provided manners by which information can be affordably communicated to locations to which such information could previously not otherwise be communicated.

A cellular telephone system is exemplary of a communication system made feasible due to such advancements. Communication pursuant to a cellular telephone system, or other radio telephonic system, is advantageous as a radio frequency communication channel forms the communication channel connecting a sending and a receiving station operable therein. Because a radio frequency communication channel forms the communication channel, fixed or hard-wired connections are not required to be formed between the sending and receiving stations. Utilization of a cellular, or other radio telephonic, communication system is therefore particularly advantageous when the use of fixed or hard-wired connections to effectuate communications would be inconvenient or impractical.

New services and new forms of communication for new radio communication systems and pursuant to already-installed cellular, and other radio telephonic, networks have also been developed.

Packet data communication systems, for instance, have been developed. In a packet data communication system, information which is to be transmitted between a sending and a receiving station is formatted into discrete packets of data. The packets are sent on a communication channel from the sending station to the receiving station. Because the information is communicated by way of discrete packets which can be transmitted during intermittent bursts, the sending station utilizes the channel only during the time periods required to send the discrete packets. A shared channel, used by a plurality of sending stations, can be used. Because a single channel can be shared by the plurality of sending stations, dedicated channels allocated to individual ones of the sending stations is not required. Lowered costs of communication are thereby possible.

Communications effectuated via the Internet and communications effectuated pursuant to paging networks are exemplary of communication systems in which packet data is transmitted. Standards have also, e.g., been set forth for the communication of packet data in existing cellular networks. GPRS (general packet radio service) communications proposed for the existing GSM (general system for mobile communications) cellular communication system is one such proposal. GPRS provides an existing GSM cellular network with the capability of communicating packet data.

A communication station, referred to as a host, such as a notebook computer, sends and receives packet data. In an Internet application, a host is formed of a computing device. Typically, although not of necessity, when the host accesses the Internet by way of a radio communication system, the host is formed of a notebook computer, or other portable device. And, when the Internet is accessed by way of a radio communication system, the host is also coupled to a radio transceiver, such as a mobile station or, e.g., a PCMCIA radio modem card. The host, together with the mobile station, or analogous device, shall, at times, together hereafter be referred to collectively as a wireless communication station or a "wireless host".

To communicate a packet of data to a wireless communication station requires that the packet be addressed with an address which identifies the wireless communication station. An Internet protocol (IP) address is exemplary of an identification address which is sometimes used to identify a communication station.

Analogous addresses are used pursuant to other protocols, such as the X.25 protocol.

The identification address used to identify the wireless communication station can be assigned temporarily with a temporary identification address. By assigning a temporary address to identify a wireless communication station, packet data can be addressed with the temporary address. And, therefore, the packet data can be routed to the wireless communication station. The wireless communication station need not have a permanent identification assigned to it as a new temporary address can be assigned to the wireless communication station for each communication session. Also, because a temporary address is used to identify the wireless communication station for only a limited time, the same address can be reassigned for use by different wireless communication stations on an as-needed basis.

A problem might occur, however, if a wireless communication station terminates a communication session abnormally. In an Internet application, for instance, the wireless communication station might access another host device to request information therefrom. And, as noted previously, a notebook computer might form a portion of the wireless communication station. If the notebook computer shuts down during a communication session without undergoing normal log-out procedures, the other host device might not be informed of the termination of the communication session. The other host device similarly might not be informed of the termination if supply of power to the wireless communication station is interrupted, or the wireless communication station moves beyond range of the radio communication network through which it accesses the Internet. Once the communication session is terminated, the temporary address used to identify the wireless communication station might be reassigned to another wireless communication station. And, packet data might be misrouted to the wireless communication station newly-identified with the temporary identification address.

A manner by which to prevent misrouting of packet data subsequent to an abnormal, communication session termination would therefore be advantageous.

It is in light of this background information related to packet data communications that the significant improvements of the present invention have evolved.

SUMMARY OF THE INVENTION

The present invention, accordingly, advantageously provides a method and apparatus for preventing misrouting of data subsequent to an abnormal termination of a communication session between a wireless host and another host device.

In one aspect of the present invention, the wireless host is identified by a temporary address. When the communication session is terminated abnormally by the wireless host, the other host device, unaware of the termination, continues to send packet data. An embodiment of the present invention selectively withholds reassignment of the temporary address. Thereby, reassignment of the temporary address to identify another wireless host is prevented. Misrouting of data communicated by the other host device to an other-than-intended wireless host is thereby avoided.

In another aspect of the present invention, a wireless host accesses the other host device by way of an Internet connection utilizing an Internet protocol, such as TCP/IP. In the event of an abnormal communication session termination by the wireless host, the temporary address used to identify the wireless host is not immediately reassigned to identify another wireless host. Instead, the temporary address is identified as being unavailable for reassignment. Because the temporary address cannot be reassigned for at least a selected period, misrouting of data from the host device to an other-than-intended wireless host is avoided.

Prevention of the misrouting of data from a host device to an other-than-intended wireless host reduces the traffic load of unwanted traffic in the radio communication system as the data which otherwise would be misrouted is instead discarded and not transmitted over a radio link to the wireless host. Additionally, if charges to users of the Internet services of radio communication system are dependent upon traffic volume communicated in the radio communication system, prevention of misrouting of the data prevents corresponding charging for traffic which cannot be transmitted to the appropriate wireless host due to the abnormal termination of the communication session.

In these and other aspects, therefore, a method, and corresponding apparatus, communicates packet data during a communication session between a selected communication station and a wireless communication station by way of a communication network. The wireless communication station is identified by a dynamically-assigned address. The dynamically-assigned address is selected from an address list. Misrouting of the data subsequent to an abnormal session end by the wireless communication station and formation of a half-open connection is prevented. A determination is made as to whether the communication session has ended abnormally. If the communication session is determined to have ended abnormally, the address list from which the dynamically-assigned address is selected is updated. The address list is updated with an indication that the dynamically-assigned address used temporarily to identify the wireless communication station is unavailable for reassignation to identify another wireless communication station for a selected time period.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1 illustrates a functional block diagram of an exemplary communication system in which an embodiment of the present invention is operable.

FIG. 2 illustrates a time-line diagram illustrating operation of an embodiment of the present invention.

FIG. 3 illustrates a sequence diagram showing the signaling sequences during operation of an embodiment of the present invention.

DETAILED DESCRIPTION

Figures 4, 5:
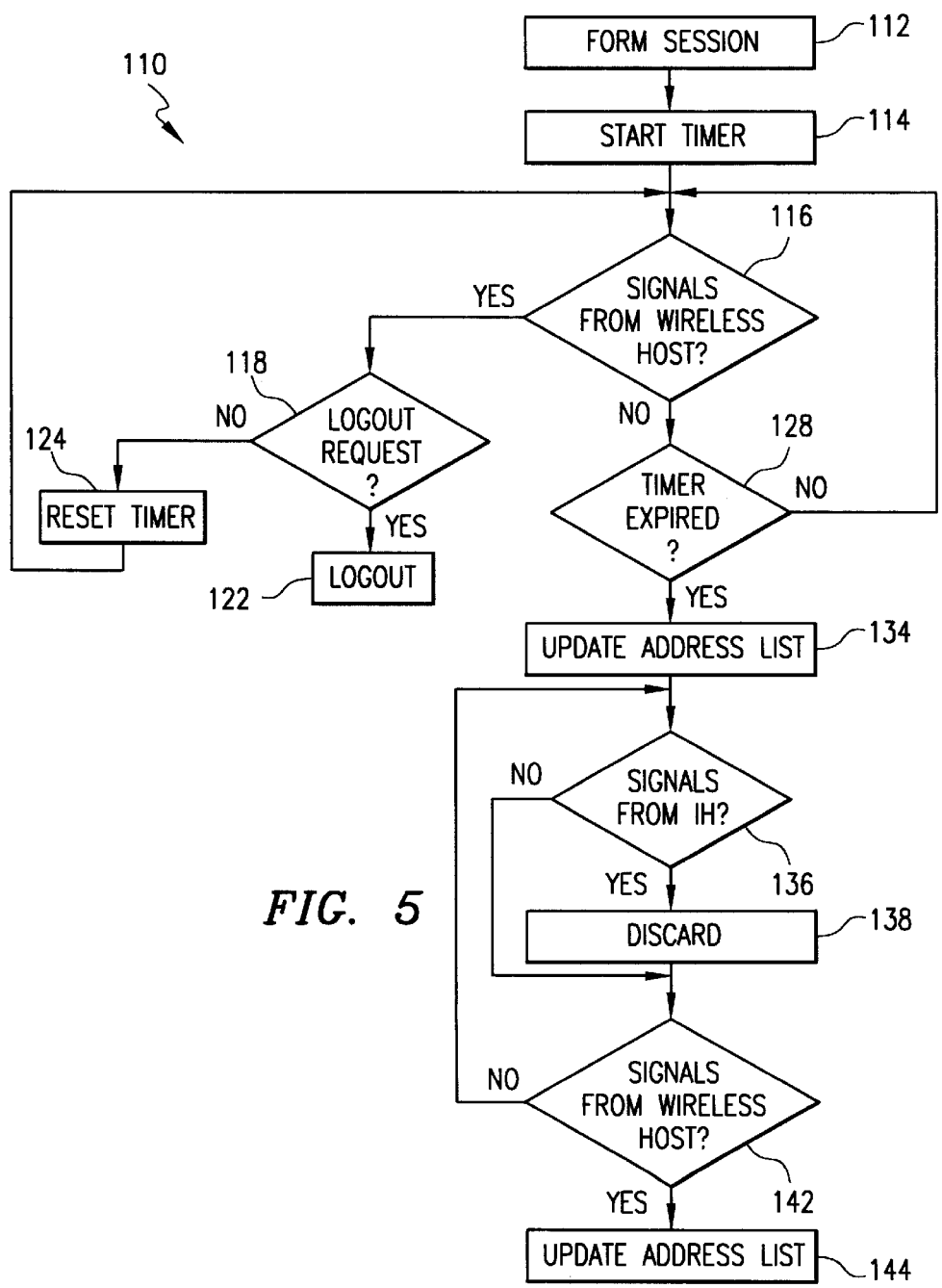
FIG. 4 illustrates an address list having address availability information updated during operation of an embodiment of the present invention.
FIG. 5 illustrates a method flow diagram illustrating the method of operation of an embodiment of the present invention.

Referring first to FIG. 1, a packet-data, mobile communication system, shown generally at 10, permits packet-data communication between two communication stations, here an Internet host 12 and a wireless host 14. When a communication session is formed between the Internet host 12 and the wireless host 14, packet-data generated at one of the hosts 12 and 14 is communicated to the other of the hosts in conventional fashion. The communication system 10 is exemplary in nature and, as shown, generally corresponds to a communication system constructed to be operable pursuant to the standard specification of the GSM (Global System for Mobile communications) system. Other communication systems can similarly be represented, such as a system compliant with the standard specification of the PDC (pacific digital cellular) system. And, an embodiment of the present invention is similarly operable in such other communication systems. In the exemplary embodiment illustrated in the Figure, once a communication session is formed between the hosts 12 and 14, bilateral communication of packet-data between the hosts 12 and 14 is permitted. Viz., packet-data generated by the host 12 can be sent to the host 14, and packet-data generated by the host 14 can be sent to the host 12.

The wireless host 14 forms a processing station, such as a notebook computer, which is coupled to a radio transceiver 16, here a mobile terminal operable in a cellular communication system. In other embodiments, the radio transceiver 16 is alternately formed of other radio transceivers, such as a PCMCIA radio modem.

The radio transceiver 16 is operable to convert signals generated by the processing station 14 into a form to permit its transmission upon a radio link formed between the radio transceiver 16 and the network infrastructure of the communication system 10. The wireless host 14 and transceiver 16 together form a wireless communication station 18 of which the host 14 forms a data source of data sink.

The network infrastructure of the communication system 10 includes a base transceiver station 22 positioned in conventional fashion to transceive communication signals with the radio transceiver 16 by way of the radio link formed therebetween. The base station 22 is, in turn, coupled to a base station controller 24. The base station controller 24 is operable to control operation of the base station 22 as well as selected others of the base stations (not shown in the Figure) of the communication system 10.

The base station controller 24 is, in turn, coupled to a packet-data, mobile switching center 28. The switching center 28 performs switching functions for providing connections for forming signal paths to permit the communication of packet-data between the Internet host 12 and the wireless host 14. The packet-data mobile switching center 28 may be physically co-located with a switching center (not shown in the Figure) used during the transmission of circuit-switched data communicated to, or by, the wireless communication station 18.

The packet-data, mobile switching center 28 is, in turn, coupled to a router 32 which is operable to route packet-data originated at the Internet host 12 or to be terminated thereat. The router, in turn, is coupled to an IP network backbone 34 to which the Internet host 12 is coupled, in conventional manner.

The packet-data mobile communication system 10 advantageously permits the communication of packet-data between the wireless host 14 and almost any Internet host 12 coupled to the IP network backbone 34. That is to say, the wireless host 14 is accessible by almost any Internet host 12, and any Internet host 12 is accessible by a wireless host 14.

To effectuate communications, the wireless host 14 is assigned with a temporary IP address to identify the wireless host for a particular communication session. The temporary IP address is assigned to the wireless host 14 during establishment of a connection by the wireless host 14 to communicate by way of an Internet connection with an Internet host. For example, a point-to-point protocol (PPP) is used to establish the connection between the hosts 12 and 14. In conventional manner, upon completion of the communication session, the temporary IP address becomes available for reallocation and reassignment to identify a host pursuant to another communication session.

Operation of an embodiment of the present invention avoids problems which might result in the event of an abnormal termination of the communication session by the wireless communication station 18. An abnormal communication session termination might occur if, for example, a user of the wireless host 14 terminates power to the wireless host during a communication session. If the wireless host 14 is formed of a notebook computer, for instance, a user of the notebook computer might shut down the computer without performing normal log-off procedures or if a portable power supply powering the notebook computer discharges to an extent preventing continued operation of the host.

An abnormal termination of the communication session might also occur if the radio transceiver 16 loses contact with the network infrastructure of the communication system or if a portable power supply powering the radio transceiver discharges to prevent its continued operation.

During operation of an embodiment of the present invention, when the mobile switching center 28 determines that a communication session has been terminated abnormally, the radio link with the wireless communication station is disconnected. But the IP address, previously used to identify the wireless host 14 during the communication session is not immediately marked to be available for reallocation and assignment to identify another host. Instead, the IP address is indicated to be unavailable for reallocation and reassignment for at least a selected time period.

The packet-data mobile switching center 28 is here shown to include, inter alia, switching circuitry 38 performing the communication path between the base station controller 24 and the router 32. The switching center 28 further includes a determiner 42 which is coupled to receive indications of communication signals generated by the wireless communication station 18 and received at the network infrastructure of the communication system 10. The determiner 42 determines whether the communication session formed between the wireless host 14 and an Internet host 12 has ended abnormally. The determination is made, in one embodiment, by determining whether communication signals have been received from the wireless communication station 18 within a selected time period. If no communications have been received from the wireless communication station within the selected time period, the communication session is determined to have ended abnormally. The switching center 28 further includes an address list 46 containing a list of, here IP, address which can be allocated and assigned to identify a wireless host.

In the event of an abnormal communication session termination, a half-opened TCP connection remains. That is to say, even though the communication session is terminated, the Internet host is unaware of the termination and continues to send packet-data to the wireless host. Operation of an embodiment of the present invention prevents reallocation and reassignment of the temporary IP address used to address the wireless host. Misrouting of the packet-data generated during a half-opened TCP connection to another wireless host is thereby prevented.

For instance, during operation of the communication system 10, a TCP/IP connection is formed, in conventional manner, between the Internet host 12 and the wireless communication station 18. A communication session between the Internet host 12 and the wireless host 14 is thereafter effectuated. To form a TCP/IP connection, an available IP address selected from the address list 46, is assigned to the wireless host 14. Packet-data to be terminated at the wireless host 14 is addressed with the IP address used to identify the wireless host. In the event of an abnormal communication session termination, a half-open TCP connection remains. And, packet-data continues to be addressed with the IP address of the wireless host 14 by the host 12.

When the determiner 42 of the switching center 28 determines the communication session to have terminated abnormally, the determiner 42 instructs the address list updater 48 to update the address list 46 with an indication that the IP address no longer identifies the wireless host 14 but indicates the IP address to be unavailable to be reallocated and reassigned to identify another wireless host. Viz., the updater 48 updates the address list 46 to "mark as free" the address but unavailable for reallocation and reassignment. Thereafter, when packet-data addressed with the IP address, previously used to identify the wireless host 14, is received at the switching center 28, the data packet is discarded. Because the IP address is made unavailable for reallocation and reassignment to identify another wireless host, misrouting of the packet of data to a newly-identified wireless host is avoided.

The time period selected during which the determination is made whether the communication signals have been received, in one embodiment, is situation-dependent. For instance, if radio contact is lost during downlink packet transmission, i.e., from the network to the wireless host, a determination is made of a communication session termination after a relatively short time period, e.g., two minutes. If there is no ongoing data exchange between two hosts, the determination is made after a longer time period, e.g., only subsequent to a time period corresponding to a complete registration period without registration by a wireless host.

FIG. 2 illustrates a time-line, shown generally at 50, which shows operation of an embodiment of the present invention in a packet-data mobile communication system. As described previously, a connection, here represented by 52, is formed between a wireless host 14 and the Internet host 12. Communication of packet-data between the Internet host 12 and the wireless host 14 is possible while the connection 52 is maintained between the hosts 12 and 14.

The X-marking 54 indicates a broken connection which causes abnormal termination of the communication session by the wireless host 14. Existence of the broken connection is determined by the packet-data mobile switching center 28 when the communication session times out, indicated at time 56. The communication session times out a selected time period, here indicated by the arrow 58 subsequent to the formation of the broken connection 54. The session times out when a determination is made if the connection 52 between the hosts 12 and 14 is determined to have been broken, resulting in an abnormal communication session termination. A communication session is determined to have ended abnormally if no communication signals generated by the wireless host 14 are detected at the switching center 28 for a time period indicated by the arrow 58.

When the session times out, the address list 46 maintained at the switching center 28 is updated to indicate that the IP address used to identify the wireless host 14 is free but is unavailable to be reallocated and reassigned to identify another wireless host for at least a selected time period.

Thereafter, additional packets of data, generated by the host 12 and addressed with the IP address used to identify the wireless host 14, and here indicated by the line 62, are discarded at the switching center 28.

A TCP probe segment is exemplary of an IP packet that might be sent by the Internet host 12 to the wireless host 14. A TCP probe segment is transmitted when a so-called, "keepalive timer" has run out at the Internet host. A "keepalive packet" is sent after two hours of inactivity of communications. A TCP packet is sent ten times every seventy-five seconds before the connection between the hosts 12 and 14 is terminated normally. The time period during which the IP address is inaccessible and not permitted to be reallocated and reassigned to identify another wireless host corresponds to this time period, Viz., a time period of two hours and fifteen minutes (2 hours+10×75 seconds). Thereby, misrouting of data to an other-than-intended wireless host is avoided. And, charges for unwanted traffic misrouted to a wireless host is avoided.

FIG. 3 illustrates a sequence diagram, shown generally at 70, showing signaling during operation of the communication system 10 when the wireless host 14 initiates a request by way of the mobile terminal 16 to transmit packets of data to the Internet host 12. For purposes of simplicity, the sequence diagram 70 illustrates signalling to and from the wireless communication station 18 of which the wireless host 14 and mobile terminal 16 form portions. A packet communication request (PCR) 76, generated by the wireless host 14, is provided to the mobile terminal 16, transmitted over a radio link, and provided to the switching center 28 of a wireless network.

Once the request 76 is received at the network, authentication procedures, here indicated by an authentication request 78 and an authentication response 82, are carried out. If the wireless communication station 16 is authenticated, an IP address is allocated and assigned to the wireless host 14, indicated by the line 86 extending back to the wireless communication station 18. And, the Internet host, with which a communication session is requested, is informed, indicated by the line 88, of the IP address assigned to the wireless host.

A connection 92 is formed between the hosts 12 and 14. A break in the connection 92, here indicated by the X-marking 94, results in a determination of an abnormal communication session termination, such as described previously. Once the communication session is determined to have ended abnormally, the IP address used to identify the wireless host is marked as free in the IP address list, but unavailable to be reallocated and reassigned to identify another host.

Subsequent packets of data addressed to the wireless host 14 by the Internet host 12 and transmitted, indicated by the line 96, by the Internet host 12 are discarded when received at the switching center 28.

FIG. 4 illustrates the address list 46 maintained at the switching center 28. As illustrated, the address list includes a listing of temporary IP addresses that are marked free, viz., not being used to identify a wireless host. Indexed against the addresses is an indication of the availability of the address to be allocated and assigned to identify a wireless host. If the IP address is unavailable to be allocated and assigned to identify a wireless host, for the reasons noted above, the unavailability of the address is so-indicated. The address list 26 is updated, such as by the address list updater 48 (shown in FIG. 1) so that the address can subsequently be allocated and assigned to identify another host during another communication session.

FIG. 5 illustrates a method, shown generally at 10, of an embodiment of the present invention. The method 110 is operable in a packet-data communication system, such as the system 10 shown previously in FIG. 1. The method 110 is carried out, for instance, through the execution of algorithms by a processing device forming a portion of a packet-data mobile switching center.

First, and as indicated by the block 112, a communication session is formed between two host devices, such as the host device 12 and the wireless host 14, shown in FIG. 1. Once the communication session is formed, packet-data can be transmitted between the hosts, in conventional manner.

Then, and as indicated by the block 114, a timer is started. Thereafter, and as indicated by the decision block 116, a determination is made as to whether communication signals are being received from the wireless communication station of which the wireless host forms a portion. If so, the yes branch is taken to the decision block 118 whereat a determination is made as to whether a log-out has been requested.

If so, the yes branch is taken to the block 122, and normal log-out procedures are carried-out. If a log-out request, i.e., a normal communication session termination, has not been generated, the no branch is taken from the decision block 118 to the block 124 whereat the timer is reset. And, the branch is taken back to the decision block 116.

If communication signals are not being detected from the wireless communication station at the decision block 116, the no branch is taken to the decision block 128. At the decision block 128, a determination is made as to whether the timer started at the block 114 has timed-out. If not, the no branch is taken back to the decision block 116. If, conversely, the timer has timed-out, the yes branch is taken from the decision block 128 to the block 132 whereat an IP address list is updated. The IP address list is updated to indicate that the IP address, previously used to identify the wireless host is free but is unavailable for a selected time period.

Thereafter, and as indicated by the decision block 136, a determination is made as to whether additional packets of data have been generated by the Internet host and addressed to the wireless host of the abnormally-terminated communication session. If additional packets have been generated, the yes branch is taken to the block 138, and the additional packets of data are discarded.

Thereafter, and as indicated by the decision block 142, a determination is made as to whether the time period during which the marked-free IP address is unavailable has expired. The no branch from the decision block 136 is also taken to the decision block 142. If the time period has not expired, the no branch is taken from the decision block 142 back to the decision block 136. Otherwise, the yes branch is taken to the block 144 whereat the IP address list is updated to indicate that the IP address is once again available for reallocation and reassignment to identify another host during another communication session.

Thereby, through operation of an embodiment of the present invention, misrouting of data subsequent to an abnormal termination of a communication session by a wireless host is avoided. Once the communication session is determined to have terminated abnormally, the IP address, used to identify the wireless host, is marked as unavailable for reallocation and reassignment to identify another host during another communication session for at least a selected time period.

The previous descriptions are of preferred examples for implementing the invention, and the scope of the invention should not necessarily be limited by this description. The scope of the present invention is defined by the following claims.

What is claimed is:

1. In a method for communicating packet data during a communication session between a selected communication station and a wireless communication station by way of a communication network, the wireless communication station identified during the communication session by a dynamically-assigned address, the dynamically-assigned address selected from an address list, an improvement of a method for preventing misrouting of the data subsequent to abnormal session end by the wireless communication station and formation of a half-open connection, said method comprising the steps of:

determining whether the communication session has ended abnormally; and in response to a determination that the communication session has ended abnormally, updating the address list with an indication that the dynamically-assigned address used temporarily to identify the wireless communication station during the communication session is unavailable for reassignment to identify another wireless communication station for a selected address-unavailable time period.

2. The method of claim 1 comprising the further step of discarding packet data communicated by the selected communication station by way of the communication network and intended for the wireless communication station if the communication session is determined during said step of determining to have ended abnormally.

3. The method of claim 1 wherein the communication session is determined during said step of determining to have ended abnormally in the absence of detection at the communication network of data generated by the wireless communication station for at least a selected time-out period.

4. The method of claim 3 wherein the communication network comprises a PMSC (packet-data mobile switching center) and wherein the communication session is determined during said step of determining to have ended abnormally in the absence of detection of the PMSC of the data generated by the wireless communication station for at least the selected time-out period.

5. The method of claim 4 wherein the address list updated during said step of updating is maintained by the PMSC and wherein said step of updating the address list is performed by the PMSC.

6. The method of claim 1 wherein the selected address-unavailable time period during which the dynamically-assigned address used temporarily to identify the wireless communication station is unavailable is of a length at least as great as a maximum time period before which the selected communication station terminates the communication session.

7. The method of claim 1 comprising the further step of releasing the dynamically-assigned address used temporarily to identify the wireless communication station to be available to identify the another wireless communication station subsequent to expiration of the selected address-unavailable time period.

8. The method of claim 7 wherein said step of releasing comprises updating the address list with an indication that the dynamically-assigned address used temporarily to identify the wireless communication station is available for reassignation to identify the another wireless communication station.

9. The method of claim 1 wherein the wireless communication station comprises a mobile host coupled to a mobile terminal, wherein the communication network comprises a PLMN (public land mobile network) coupled to an IP network, wherein the dynamically-assigned address comprises an IP address which uniquely identifies the mobile host, and wherein the address list updated during said step of updating identifies the mobile host by the IP address together with an availability indicator to indicate whether the IP address is available for reassignation.

10. The method of claim 9 wherein the selected communication station comprises an IP host, the IP host having a keepalive timer associated therewith, and wherein the selected address-unavailable time period during which the IP address used temporarily to identify the wireless IP host is unavailable for reassignation is at least as great as a time-out period of the keepalive timer.

11. In a packet data communication system in which packet data is communicated during a communication session between a selected communication station and a wireless communication station by way of a communication network, the wireless communication station identified during the communication session by a dynamically-assigned address selected from an address list, a combination with the communication network of apparatus for preventing misrouting of the data subsequent to an abnormal communication session end by the wireless communication station, said apparatus comprising:

a determiner coupled to receive indications of communications generated by the wireless communication station, said determiner for determining whether the communication session has ended abnormally; and an address list updater operable responsive to determinations by said determiner of an abnormal communication session end for updating the address list with an indication that the dynamically-assigned address used temporarily to identify the wireless communication station during the communication session is unavailable for reassignation to identify another wireless communication station for a selected address-unavailable time period.

12. The apparatus of claim 11 wherein said determiner is operable to determine the communication session to have ended abnormally in the absence of detection both of a normal communication session end and of communication generated by the wireless communication station for at least a selected time-out period.

13. The apparatus of claim 11 wherein the communication network comprises a PMSC (packet-data mobile switching center) and wherein said determiner forms a portion of the PMSC.

14. The apparatus of claim 13 wherein said address list updater forms a portion of the PMSC.

15. The apparatus of claim 13 wherein said address list updater is further for updating the address list with an indication that the dynamically-assigned address used temporarily to identify the wireless communication station is available for reassignation to identify the another wireless communication station subsequent to the selected address-unavailable time period.

16. A method for communicating packet data during a communication session between a wireless communication station and a selected communication station by way of a communication network, said method comprising the steps of:

assigning the wireless communication station with a temporary address selected from an address list;

during the communication session, addressing packet data to be communicated to the wireless communication station by the selected communication station with the temporary address assigned during said step of assigning;

during the communication session, sending the packet data, once addressed with the temporary address, from the selected communication station to the wireless communication station;

determining whether the communication session has ended abnormally;

in response to a determination that the communication session has ended abnormally, updating the address list with an indication that the temporary address used temporarily to identify the wireless communication station during the communication session is unavailable for reassignation to identify another wireless communication station for a selected time period; and discarding additional packet data sent by the selected communication station and intended for the wireless communication station if the communication session is determined during said step of determining to have ended abnormally.

17. Apparatus for a packet data communication network which communicates packet data during a communication session between a selected communication station and a wireless communication station, said apparatus comprising:

an address assignor coupled to receive indications of registration of the wireless communication station with the communication network, said address assignor having an address list and for assigning a temporary address, selected from the address list, to the wireless communication station for identifying the wireless communication station during the communication session;

a determiner coupled to receive communications generated by the wireless communication station, said determiner for determining whether the communication session has ended abnormally; and an address list updater coupled to said address assignor and operable responsive to determinations of said determiner that the communication session has ended abnormally for updating the address list with an indication that the temporary address used temporarily to identify the wireless communication station during the communication session is unavailable for reassignation to identify another wireless communication station.

* * * * *